United States Patent [19]

Sarvis

[11] 4,440,213
[45] Apr. 3, 1984

[54] RECUPERATOR WITH FLOATING INTERIOR HOUSING

[75] Inventor: Robert E. Sarvis, Toledo, Ohio

[73] Assignee: Midland-Ross Corporation, Cleveland, Ohio

[21] Appl. No.: 301,314

[22] Filed: Sep. 11, 1981

[51] Int. Cl.³ .............................................. F24H 3/00
[52] U.S. Cl. ...................................... 165/47; 165/76; 165/81; 165/154; 165/DIG. 2; 237/55
[58] Field of Search .................. 165/81, 76, 82, 83, 165/154; 237/55; 285/41, 343, 346; 126/364, 110

[56] References Cited

U.S. PATENT DOCUMENTS

| 38,809 | 6/1863 | Burnell | 165/DIG. 2 |
| 199,119 | 1/1878 | Stumm | 126/364 |
| 2,356,392 | 8/1944 | Flour | 237/55 |
| 2,549,687 | 4/1951 | Jack et al. | 285/346 |
| 3,859,040 | 1/1975 | Shefsiek et al. | 165/154 |
| 4,360,057 | 11/1982 | Koump | 165/76 |

Primary Examiner—William R. Cline
Assistant Examiner—Edward P. Walker
Attorney, Agent, or Firm—H. Duane Switzer

[57] ABSTRACT

A metal recuperator is described as having an exterior casing with a replaceable inner housing which forms with the casing a pair of separated fluid passageways through which two fluids, at different temperatures, are circulated into heat exchanging relationship. Special seals are provided to allow relative movement between the casing and the housing while sealing the passageways from each other and the ambient atmosphere.

3 Claims, 4 Drawing Figures

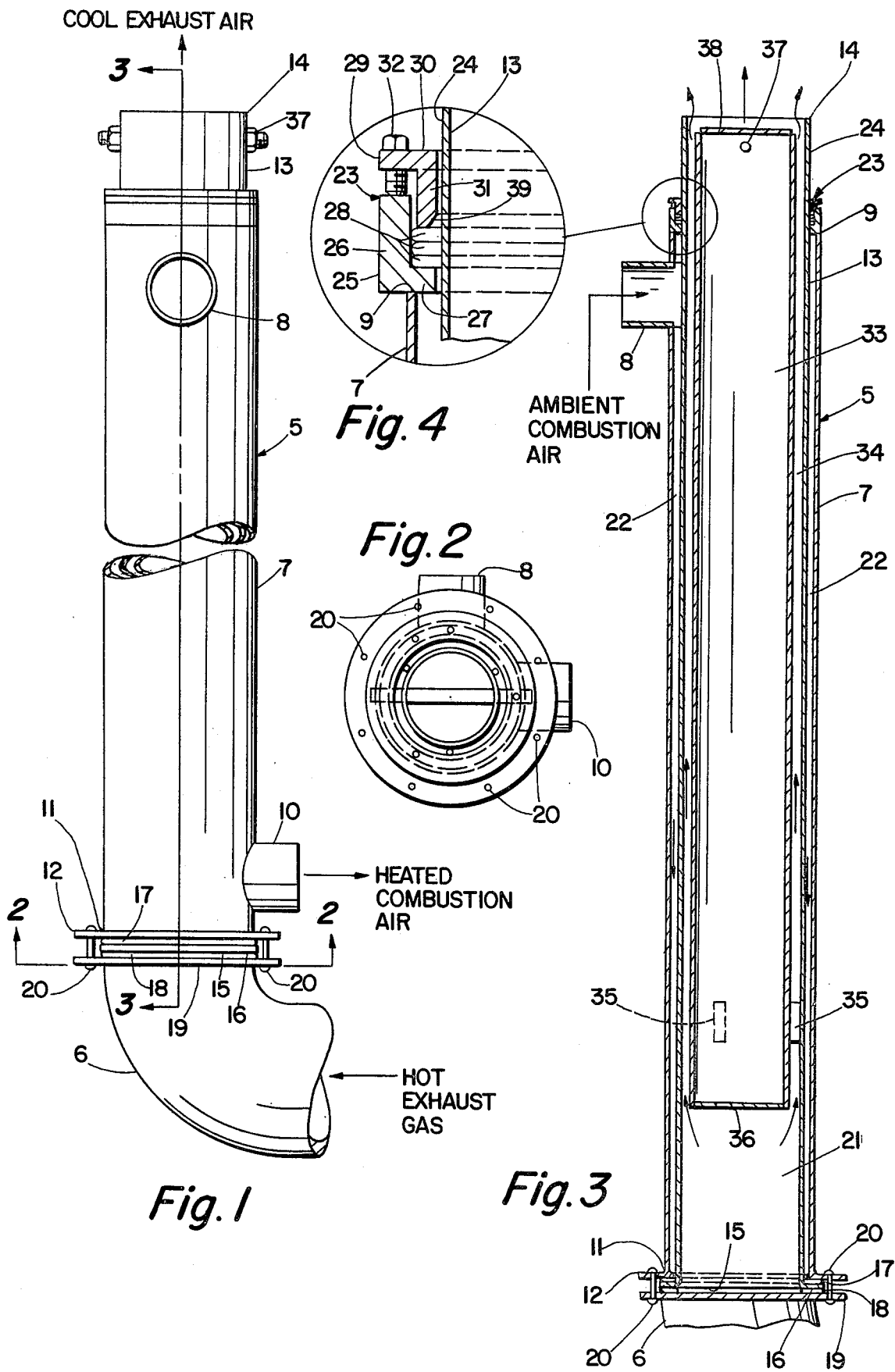

RECUPERATOR WITH FLOATING INTERIOR HOUSING

BACKGROUND OF THE INVENTION

The invention relates to metal recuperators, especially those used to recapture heating energy from hot exhaust gas which is normally vented into the atmosphere through a flue pipe or stack. Such recuperators are normally made of stainless steel components which are of welded construction, thereby making the dismantling and replacement of the entire recuperator, upon wear, very time consuming and costly, especially when the downtime of the furnace or oven to replace the recuperator, is considered. The invention is directed to solving this problem by the provision of a simplified, unwelded recuperator structure wherein the parts, subject to higher temperatures and greater wear, are easily removed and replaced with a minimum of downtime necessitated to make the repairs since no welds need be broken, as is the case when recuperators of welded construction, are replaced.

Briefly stated, the invention is in a recuperator which comprises an outer, hollow casing which is fixedly mounted on, for example, an elbow of a flue pipe or stack. The casing is provided with an inlet through which fluid enters the casing and an outlet through which the fluid exits the casing. A hollow housing is removably mounted interiorly of the casing and forms with the casing an outer fluid passageway which extends between the fluid inlet and outlet. An inner fluid passageway is formed within the housing and extends longitudinally of the casing. The inner fluid passageway is also provided with an inlet port and an outlet port through which another fluid, at a different temperature, is circulated through the inner fluid passageway into heat exchange relation with fluid being circulated through the outer fluid passageway in an opposite direction. Special seals are provided at each end of the casing between the housing and casing and elbow to seal the fluid passageways from each other and the ambient atmosphere, while allowing expansion and contraction of the housing relative to the casing.

Another aspect of the invention is the provision of a core, which is placed within the housing to channel the fluid passing through the housing into greater heat exchanging relation with fluid circulating through the outer fluid passageway.

DESCRIPTION OF THE DRAWING

The following description of the invention will be better understood by having reference to the accompanying drawing, wherein:

FIG. 1 is a side view of a recuperator which is made in accordance with the invention;

FIG. 2 is the recuperator viewed from the line 2—2 of FIG. 1;

FIG. 3 is a section of the recuperator viewed from the line 3—3 of FIG. 1; and

FIG. 4 is an enlarged view of the portion of the upper seal encircled in FIG. 3.

DETAILED DESCRIPTION OF THE DRAWING

With general reference to the drawing, there is shown a recuperator 5 which is bolted atop an elbow 6 of a flue pipe or stack (not completely shown). The recuperator 5 comprises an outer, hollow cylindrical stainless steel casing 7 which is normally vertically disposed and has a fluid inlet 8 that is adjacent its vertically upper most open end 9 and a fluid outlet 10 that is adjacent its vertically lowermost open end 11 which is provided with an outstanding annular flange 12.

A hollow, cylindrical stainless steel housing 13 of smaller diameter than the casing 7, is positioned longitudinally within the casing 7 and has a pair of opposing open ends 14, 15 which terminate beyond the adjacent open ends 9, 11 of the casing 7. The vertically lowermost open end 15 of the housing 13 is provided with an outstanding annular rim 16 which is sandwiched between a pair of annular, resiliently compressable sealing rings 17, 18 which, in turn, are positioned between the annular flange 12 of the casing 7 and an adjacent annular flange 19 of the elbow 6. The sealing rings 17, 18 are composed of any suitable high temperature resistant ceramic-type material. A plurality of similar bolts 20 are provided to bolt the annular flanges 12, 19 of the outer casing 7 and elbow 6 together in compressive engagement with the ring seals 17, 18 and annular flange 16 of the inner housing 13 to seal at one end of the recuperator 5, (I) the longitudinally extending inner fluid passageway 21, formed within the housing 13, from the ambient atmosphere, (II) the outer, annular fluid passageway 22, formed between the casing 7 and housing 13 and the fluid inlet 8 and outlet 10, from the ambient atmosphere, and (III) the inner and outer fluid passageways 21, 22 from each other.

The vertically lowermost open end 15 of the housing 13 acts as an inlet port through which hot exhaust gas from the flue stack, enters the inner fluid passageway 21 of the recuperator 5, whereas the vertically uppermost open end 14 of the housing 13 acts as an outlet port through which cooled exhaust gas exits the recuperator for discharge, for example, into the ambient atmosphere.

A seal 23 is provided adjacent the vertically uppermost open end 9 of the casing 7 between the casing 7 and adjacent outer wall 24 of the housing 13 to seal the outer fluid passageway 22 from the ambient atmosphere. The seal 23, as best seen in FIG. 4, comprises a first, rigid annular member 25 which has an L-shaped cross-section and which is welded around the open end 9 of the casing 7. The first, stationary member 25 has an upstanding cylindrical wall or major leg 26 which parallels the cylindrical housing 13, and an annular support ledge or minor leg 27 which extends horizontally towards, and terminates just short of, the housing 13. A plurality of similar, sealing rings 28 are stacked on the support ledge 27 of the stationary member 25 between the housing 13 and adjacent cylindrical wall 26. The sealing rings 28 are composed of any suitable high temperature resistant, resiliently compressable ceramic-type material, such as three layer of ceramic rope. The seal 23 also comprises a second, annular movable member 29 which has an inverted L-shaped cross-section and is correspondingly but oppositely configured from the stationary member 25 to engage the ring seals 28 and compress them against the housing 13 to seal the outer fluid passageway 22 adjacent the vertically uppermost end of the recuperator 5 to prevent the escape of fluid in said passageway into the ambient atmosphere. The second, movable member 29 is mounted on the stationary member 25 for reciprocating movement to and from the ring seals 28 and comprises a horizontally disposed annular flange or leg 30 which overlaps the vertical wall 26 of the stationary member 25, and a cylindrical wall, finger, or leg 31 which extends downwardly between the housing 13 and the cylindrical wall 26 of the stationary member 25. A plurality of similar threaded bolts or set screws 32, carried by the movable member 29, are equally spaced around the annular flange 30 of the movable member 29, and are threadably received in the upstanding end of the cylindrical wall 26 of the stationary member 25, and are used to move the tip of the cylindrical finger 31 of the movable member 29 into and out of compressive engagement with the ring seals 28. It can be appreciated from the above description that the housing 13 is resiliently supported on and by the ring seals 17, 18, 28 so that the housing 13 is free to thermally expand and contract, or move slightly, relative to the casing 7. Thus, the housing 13 can be said to float freely within the casing 7.

A hollow, stainless steel cylindrical core 33, closed at both ends, is positioned longitudinally and centrally within the housing 13 and forms with the housing an inner, annular fluid passageway 34 through which fluid is channeled into greater contact with the adjacent, cylindrical wall of the housing 13 to better heat the wall and subsequently the fluid being circulated through the outer annular passageway 22 between the casing 7 and the housing 13. A plurality of similar, spacer bars 35 are secured adjacent the vertically lowermost closed end 36 of the core 33 and act to help space the core 33 centrally within the housing 13 without impeding the flow of fluid throught the inner, annular fluid passageway 34. A spacer bolt 37, extending through the vertically uppermost closed end 38 of the core 33 and adjacent open end 14 of the housing 13, acts to support and help space the core 33 centrally within the housing 13.

In operation, hot exhaust gas circulates upwardly through the housing 13 and inner, annular fluid passageway 34 into heat exchanging relation with, for example, combustion air which enters the fluid inlet 8 at ambient temperature, flows downwardly through the outer, annular fluid passageway 22, and exits the fluid outlet 10 heated for subsequent mixture with fuel.

It can be appreciated from the above description that the housing 13 and inner core 33 are exposed to higher temperatures than the casing 7 and are, therefore, more susceptible to damage and need of repair or replacement. The unscrewing of a few bolts 20, 32 is all that is needed to quickly remove the recuperator from atop the elbow 6 of the flue stack and replace the damaged housing and core with new parts. This is far simpler and less costly than dismantling a recuperator that is welded to the flange of an elbow of a flue stack.

The seal engaging tip of the finger 31 of the movable member 29 is provided with an annular chamfer 39 which faces the housing 13 and acts to wedge a portion of the ring seals 28, especially the vertically uppermost ring seal, radially into compressive engagement with the housing 31 to provide a better seal with the housing than if a flat, blunted tip were used.

What is claimed:

1. In a recuperator installation which is readily dismantled for replacement and repair of worn and damaged parts without breaking welds:
   (a) a recupertor, and a flue stack elbow which terminates in a generally horizontally disposed annular flange; said recuperator comprising
   (b) a first compressible, annular sealing ring disposed on the flue elbow flange;
   (c) a hollow, cylindrical metal housing extending generally vertically from the sealing ring, the housing having an annular rim extending radially outwardly from a lower end thereof and resting upon the first sealing ring, the housing receiving heated fluids centrally through the lower end thereof and terminating at an upper end thereof in an outlet port;
   (d) a second compressible, annular sealing ring disposed on the housing rim;
   (e) a hollow, cylindrical metal casing surrounding the housing in a spaced relationship therewith, the casing having a radially outward extending annular flange at a lower end thereof which rests upon the second sealing ring, the casing defining an outer fluid passage between the casing and the housing which is sealed at a lower end by the second annular sealing ring, the casing having a fluid inlet adjacent an upper end thereof and a fluid outlet adjacent the lower end thereof;
   (f) the casing flange and the flue elbow flange each including a plurality of aligned apertures therethrough, the casing and flue elbow flange apertures being disposed peripherally outward from the housing annular rim, a plurality of fasteners communicating between said aligned apertures for releasably securing the flue elbow flange and the casing flange together and compressing the sealing rings into sealing contact with the flanges and the housing rim;
   (g) a stationary annular member which is L-shaped in radial cross section positioned on and extending peripherally around a casing upper end, the stationary member having an annular minor leg projecting radially inward from said casing to define an annular support ledge above the casing and between the casing and the housing, and an annular major leg integral with said minor leg extending generally vertically upward from the casing and in outwardly spaced parallel relation to the housing;
   (h) a plurality of compressible sealing rings stacked on the support ledge in confining frictional contact with the stationary member major leg and the housing;
   (i) a movable annular member which is L-shaped in radial cross section mounted for movement between the stationary member and the housing, the movable member having an annular major leg extending downward between the housing and the stationary member major leg and radially outward extending minor leg integral with the movable member major leg and disposed in overlying spaced relation with the stationary member major leg;
   (j) a plurality of threaded fasteners extending through the movable member minor leg and threadedly received in an upper peripheral face of the stationary member major leg for selectively urging the movable member major leg and stationary member minor leg toward each other for compressing the stack of confined sealing rings therebetween and into firm, sealing contact with the housing and the stationary member major leg;
   (k) a hollow, cylindrical metal core with opposing closed ends disposed longitudinally and centrally within the housing to define an inner annular fluid passage between the core and the housing;
   (l) a plurality of spacers operatively disposed adjacent a lower end of the core for spacing the core lower end centrally within the housing; and, (m) a removable spacer member extending through the core and housing adjacent the upper ends thereof and remote from the flue stack and hot exhaust gases discharging therefrom for supporting the core in the housing and for maintaining a radially spaced relationship therebetween, the core lowermost end being displaced longitudinally inward from the housing and casing lower ends to define a region for receiving hot exhaust gases from the flue stack, whereby wear from the turbulence as the hot exhaust gases are channeled into the inner fluid passage tends to cause wear of the readily replaceable housing and cylindrical core rather than the flue pipe, the spacer member being readily removable for allowing the core to be withdrawn from the housing.

2. A simplified, unwelded recuperator in which the components which are subject to higher temperatures and greater wear are easily removed and replaced with a minimum of down time and without breaking welds, the recuperator comprising:

(a) a hollow, outer casing having opposed lower and upper open ends and including peripherally facing fluid inlet and outlet openings therethrough, the casing lower end having an outwardly extending peripheral flange, the casing upper end being rigidly connected with an annular stationary member which extends peripherally therearound, the stationary member having an L-shaped transverse cross section with a major leg extending peripherally around, parallel to and upwardly above the outer casing, the stationary member further having a minor leg extending radially inward from the major leg;

(b) a hollow, heat conductive housing having opposed upper and lower open ends, the housing being disposed interiorly of the outer casing and extending longitudinally thereof slidably through the stationary member minor leg, the housing lower end extending beyond the casing lower end flange and having a radially outward extending rim disposed longitudinally spaced from the casing lower end flange, the housing upper end extending upwardly beyond the outer casing upper end and defining a fluid discharge opening therethrough, the housing and outer casing defining an outer fluid passage therebetween for receiving air to be heated;

(c) a cylindrical core with closed ends disposed longitudinally within the housing and radially displaced therefrom such that an inner fluid passage is defined therebetween for passing exhaust gases therethrough;

(d) lower mounting means for mounting the housing and outer casing with a flue pipe in a spaced relationship to each other, the lower mounting means including a first compressible annular sealing ring sandwiched between the housing annular rim and casing flange, a second compressible annular sealing ring sandwiched between the housing rim and the flue pipe, a plurality of threaded fasteners which releasably compress the flange, rim, flue pipe, and sealing rings together such that the outer fluid passage is sealed at the lower end of the outer casing and the housing with the flue pipe disposed in fluid communication with the inner fluid passage, the casing and housing to be selectively removed from a mounted relationship relative to the flue pipe;

(e) an upper mounting means for sealing the outer fluid passage adjacent the outer casing upper end, the upper mounting means including a plurality of annular sealing rings stacked on the stationary minor leg and extending radially betweeen the housing and the stationary major leg, a movable annular member which is L-shaped in transverse cross section slidably received around the housing, the movable member having a major leg received between the housing and the stationary member major leg and a minor leg extending radially outward therefrom above the stationary member major leg, and plurality of threaded fasteners extending between the movable minor leg and the stationary member major leg for selectively causing the movable member to be moved against the stacked sealing rings for compressing them into engagement with the housing and stationary member, whereby the housing and casing are sealingly connected but movable relative to each other to allow for uneven expansion and contraction when the housing temperature fluctuates over a wider range of tempertures than the casing; and, (f) unwelded core mounting means for mounting the cylindrical core centrally within the housing for ready removal and replacement without breaking welds, the core mounting means including a plurality of spacer bars disposed peripherally around a lower end of the cylindrical core to space the core generally centrally within the housing without impeding the flow of exhaust gases therebetween, and a spacer member extending through an upper end of the cylindrical core and housing above the upper end of the outer casing, remote from the flue stack and hot exhaust gases discharging therefrom, for supporting the core and for spacing the core generally centrally within the housing with the core lowermost end being displaced longitudinally inward from the housing and casing lower ends to define a region for receiving hot exhaust gases from the flue stack, whereby wear from the turbulence as the hot exhaust gases are channeled into the inner fluid passage tends to cause wear of the readily replaceable housing and cylindrical core rather than the flue pipe, the spacer member being readily removable for allowing the core to be withdrawn from the housing.

3. The recuperator as set forth in claim 2 wherein the cylindrical core comprises a hollow, stainless steel cylinder which is capped at the uppermost and lowermost ends thereof to seal the core interior.

* * * * *